(12) United States Patent
Shuto et al.

(10) Patent No.: US 10,226,800 B2
(45) Date of Patent: Mar. 12, 2019

(54) HOT-ROLLED STEEL SHEET

(71) Applicant: NIPPON STEEL & SUMITOMO METAL CORPORATION, Tokyo (JP)

(72) Inventors: Hiroshi Shuto, Tokyo (JP); Tatsuo Yokoi, Tokyo (JP); Daisuke Maeda, Tokyo (JP); Eisaku Sakurada, Tokyo (JP); Takeshi Toyoda, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 95 days.

(21) Appl. No.: 15/324,241

(22) PCT Filed: Jul. 13, 2015

(86) PCT No.: PCT/JP2015/070078
§ 371 (c)(1),
(2) Date: Jan. 5, 2017

(87) PCT Pub. No.: WO2016/010004
PCT Pub. Date: Jan. 21, 2016

(65) Prior Publication Data
US 2017/0197235 A1 Jul. 13, 2017

(30) Foreign Application Priority Data
Jul. 14, 2014 (JP) ................................ 2014-144502

(51) Int. Cl.
*C22C 38/58* (2006.01)
*C22C 38/02* (2006.01)
(Continued)

(52) U.S. Cl.
CPC ................. *B21B 1/22* (2013.01); *B21B 1/26* (2013.01); *B21B 3/00* (2013.01); *B32B 15/18* (2013.01);
(Continued)

(58) Field of Classification Search
CPC ...... C21D 8/0226; C21D 8/0426; C21D 9/46; C21D 2211/002
See application file for complete search history.

(56) References Cited

U.S. PATENT DOCUMENTS 6,364,968 B1 4/2002 Yasuhara et al.
2012/0279617 A1 11/2012 Kawasaki et al.
(Continued)

FOREIGN PATENT DOCUMENTS

CN 102666901 A 9/2012
EP 1362930 A1 11/2003
(Continued)

OTHER PUBLICATIONS

International Search Report for PCT/JP2015/070078 (PCT/ISA/210) dated Oct. 13, 2015.
(Continued)

Primary Examiner — Scott R Kastler
Assistant Examiner — Vanessa T. Luk
(74) Attorney, Agent, or Firm — Birch, Stewart, Kolasch & Birch, LLP

(57) ABSTRACT

A hot-rolled steel sheet according to the present invention has a chemical composition comprising, in mass %, C: 0.03 to 0.2%, Mn: 0.1 to 3.0%, P: 0.10% or less, S: 0.03% or less, Al+Si: 0.2 to 3.0%, N: more than 0% and equal to or less than 0.01%, O: more than 0% and equal to or less than 0.01%, and the balance: iron and impurities. A microstructure of the hot-rolled steel sheet contains bainite as the main constituent, and contains hard phases constituted by martensite and/or austenite in an amount of, in area fraction, equal to or more than 3% and less than 20% where 60% or more of the hard phase present in a sheet-thickness central portion have an aspect ratio of 3 or more, the hard phases present in the sheet-thickness central portion have a length (Continued)

in a rolling direction of less than 20 μm, and the sum of X-ray random intensity ratios of <011> orientation and <111> orientation as viewed from the rolling direction is 3.5 or more, and an X-ray random intensity ratio of <001> orientation as viewed from the rolling direction is 1.0 or less.

6 Claims, 1 Drawing Sheet

(51) Int. Cl.
| | | |
|---|---|---|
| C22C 38/06 | (2006.01) | |
| B21B 1/22 | (2006.01) | |
| B21B 1/26 | (2006.01) | |
| B21B 3/00 | (2006.01) | |
| C21D 8/02 | (2006.01) | |
| C21D 9/46 | (2006.01) | |
| C22C 38/00 | (2006.01) | |
| B32B 15/18 | (2006.01) | |
| C22C 38/04 | (2006.01) | |
| C22C 38/12 | (2006.01) | |
| C22C 38/14 | (2006.01) | |
| C22C 38/16 | (2006.01) | |
| C23C 2/06 | (2006.01) | |
| C23C 2/28 | (2006.01) | |
| C23C 2/40 | (2006.01) | |
| C21D 8/04 | (2006.01) | |

(52) U.S. Cl.
CPC ............ *C21D 8/02* (2013.01); *C21D 8/0226* (2013.01); *C21D 9/46* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C22C 38/58* (2013.01); *C23C 2/06* (2013.01); *C23C 2/28* (2013.01); *C23C 2/40* (2013.01); *B21B 2001/225* (2013.01); *C21D 8/0426* (2013.01); *C21D 2211/002* (2013.01)

(56) References Cited

U.S. PATENT DOCUMENTS

| | | |
|---|---|---|
| 2014/0242415 A1 | 8/2014 | Azuma et al. |
| 2015/0203949 A1 | 7/2015 | Yokoi et al. |

FOREIGN PATENT DOCUMENTS

| | | | |
|---|---|---|---|
| EP | 1365037 A1 | | 11/2003 |
| EP | 2559783 A1 | | 2/2013 |
| JP | 4-337026 A | | 11/1992 |
| JP | 7-90478 A | | 4/1995 |
| JP | 11-92859 A | | 4/1999 |
| JP | 11-152544 A | | 6/1999 |
| JP | 2002-309334 A | | 10/2002 |
| JP | 2003-3229 A | | 1/2003 |
| JP | 2004-91924 A | | 3/2004 |
| JP | 2004-211199 A | | 7/2004 |
| JP | 2005-133201 A | | 5/2005 |
| JP | 2005-320619 A | | 11/2005 |
| JP | 2009-19265 A | | 1/2009 |
| JP | 2009019265 A | * | 1/2009 |
| JP | 2010-70789 A | | 4/2010 |
| JP | 2012-172203 A | | 9/2012 |
| KR | 10-2014-0030785 A | | 3/2014 |
| TW | 201319266 A1 | | 5/2013 |
| TW | 201425599 A | | 7/2014 |
| WO | WO 2014/019844 A1 | | 2/2014 |

OTHER PUBLICATIONS

Taiwanese Office Action Issued in Corresponding Application No. 104122737 dated Mar. 16, 2016.
Written Opinion of the International Searching Authority for PCT/JP2015/070078 (PCT/ISA/237) dated Oct. 13, 2015.
Chinese Office Action and Search Report issued in Chinese Application No. 201580037089.1 dated Nov. 10, 2017.
Extended European Search Report issued in European Application No. 15822169.7 dated Oct. 26, 2017.
Yang et al., "Through-thickness shear strain control in cold rolled silicon steel by the coupling effect of roll gap geometry and friction," Journal of Materials Processing Technology, vol. 210, No. 12, Sep. 1, 2010, pp. 1545-1550.

* cited by examiner (a)
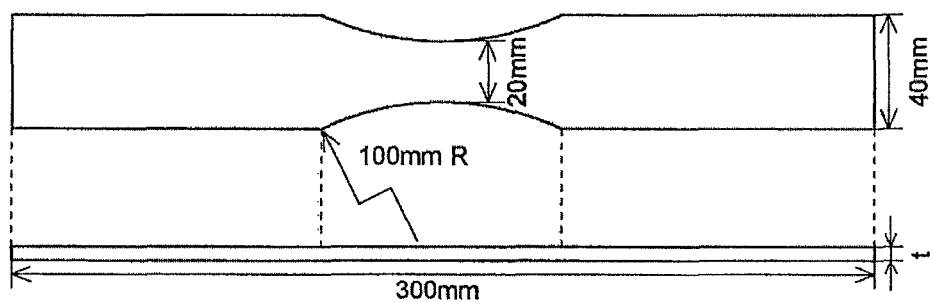
(b)
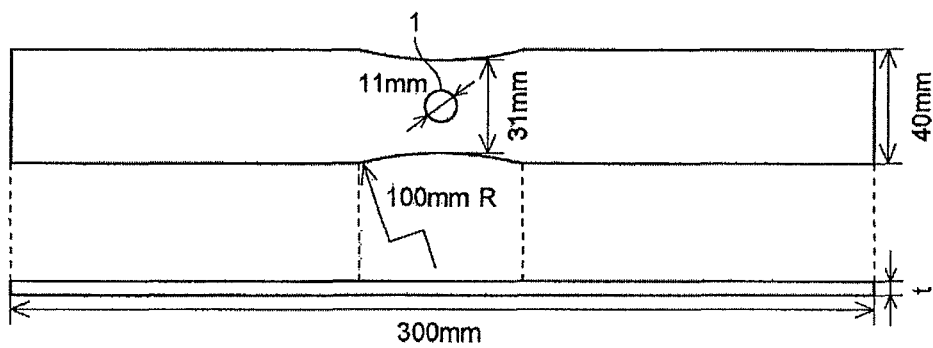

HOT-ROLLED STEEL SHEET

TECHNICAL FIELD

The present invention relates to a hot-rolled steel sheet.

BACKGROUND ART

Conventionally, for the purpose of reducing the weight of automobile bodies, high-strength steel sheets have been often used for suspension parts or structural parts of automobile bodies. Suspension parts of automobiles are required to have fatigue characteristics of a notch-free material and notch fatigue characteristics, but there has been a problem in that conventional high-strength steel sheets are insufficient in such performance and do not allow parts to be reduced in sheet thickness.

To improve fatigue characteristics of a notch-free material, it is effective to make the structure finer. For example, Patent Literatures 1 and 2 describe hot-rolled steel sheets that contain ultrafine ferrite grains with an average grain size of less than 2 μm as hot-rolled, and contain bainite or the like as a secondary phase. It is described that these steel sheets are excellent in ductility, toughness, fatigue strength, and the like, and have low anisotropy in these characteristics. In addition, since a fatigue crack occurs from near the surface, it is also effective to make the structure near the surface finer. Patent Literature 3 describes a hot-rolled steel sheet having a crystal grain size gradient structure in which the average crystal grain size of polygonal ferrite, which is the main phase, gradually decreases from the center of the sheet thickness toward the surface layer and containing, in volume fraction, 5% or more bainite or the like as a secondary phase. Furthermore, grain refining of a martensite structure is also effective in improving fatigue characteristics. Patent Literature 4 describes a machine structural steel pipe in which 80% or more in area fraction of the microstructure is martensite, the average block diameter of the martensitic structure is 3 μm or less, and the maximum block diameter is 1 to 3 times the average block diameter. Patent Literature 4 also describes making the structure of a slab before pipe-making into lower bainite or martensite in hot rolling to uniformly disperse carbon. However, although grain refining improves fatigue characteristics of a notch-free material, it has no effect of delaying a crack propagation rate, thus not contributing to an improvement in notch fatigue characteristics.

Regarding an improvement in notch fatigue characteristics, it has been reported that it is effective to reduce a crack propagation rate by forming a composite structure. In Patent Literature 5, hard bainite or martensite is dispersed in a structure whose main phase is fine ferrite; thus, fatigue characteristics of a notch-free material and notch fatigue characteristics are both achieved. It is reported in Patent Literatures 6 and 7 that increasing an aspect ratio of martensite in a composite structure reduces a crack propagation rate.

CITATION LIST

Patent Literature

Patent Literature 1: JP H11-92859A
Patent Literature 2: JP H11-152544A
Patent Literature 3: JP 2004-211199A
Patent Literature 4: JP 2010-70789A
Patent Literature 5: JP H04-337026A
Patent Literature 6: JP 2005-320619A
Patent Literature 7: JP H07-90478A

SUMMARY OF INVENTION

Technical Problem

Patent Literature 5 does not describe a technique for improving press formability, and does not pay particular attention to the hardness and shape of bainite and martensite; hence, it seems that favorable press formability is not achieved.

Patent Literatures 6 and 7 lack consideration of ductility and workability (e.g., hole expandability), which are needed in press forming.

The present invention has been made in order to solve such problems, and aims to provide a hot-rolled steel sheet having excellent fatigue characteristics in the rolling direction and workability and having a tensile strength of 780 MPa or more.

Solution to Problem

The present inventors have carried out extensive research in order to achieve the above object, and have succeeded in producing a steel sheet with excellent fatigue characteristics in the rolling direction and workability, by optimizing the chemical composition and production conditions of a high-strength hot-rolled steel sheet to control the microstructure of the steel sheet. The gist of the present invention is as follows.

(1)

A hot-rolled steel sheet having a chemical composition consisting of, in mass %, C: 0.03 to 0.2%,
Mn: 0.1 to 3.0%,
P: 0.10% or less,
S: 0.03% or less,
Al+Si: 0.2 to 3.0%,
N: more than 0% and equal to or less than 0.01%,
O: more than 0% and equal to or less than 0.01%,
Ti: 0 to 0.3%,
Nb: 0 to 0.3%,
Mg: 0 to 0.01%,
Ca: 0 to 0.01%,
REM: 0 to 0.1%,
B: 0 to 0.01%,
Cu: 0 to 2.0%,
Ni: 0 to 2.0%,
Mo: 0 to 1.0%,
V: 0 to 0.3%,
Cr: 0 to 2.0%, and
the balance: iron and impurities, and a microstructure of the hot-rolled steel sheet which contains bainite as the main constituent, and contains hard phases constituted by martensite and/or austenite in an amount of, in area fraction, equal to or more than 3% and less than 20%, wherein 60% or more of the hard phases present in a sheet-thickness central portion have an aspect ratio of 3 or more, the hard phases present in the sheet-thickness central portion have a length in a rolling direction of less than 20 μm, and the sum of X-ray random intensity ratios of <011> orientation and <111> orientation as viewed from the rolling direction is 3.5 or more, and an X-ray random intensity ratio of <001> orientation as viewed from the rolling direction is 1.0 or less.

(2)

The hot-rolled steel sheet according to (1), containing, in mass %, one or more selected from Ti: equal to or more than (0.005+48/14[N]+48/32[S])% to equal to or less than 0.3%, and Nb: 0.01 to 0.3%, where [N] indicates an N content (mass %) and [S] indicates an S content (mass %).

(3)

The hot-rolled steel sheet according to (1), containing, in mass %, one or more selected from Mg: 0.0005 to 0.01%, Ca: 0.0005 to 0.01%, and REM: 0.0005 to 0.1%.

(4)

The hot-rolled steel sheet according to (1), containing, in mass %,

B: 0.0002 to 0.01%.

(5)

The hot-rolled steel sheet according to (1), containing, in mass %, one or more selected from Cu: 0.01 to 2.0%, Ni: 0.01 to 2.0%, Mo: 0.01 to 1.0%, V: 0.01 to 0.3%, and Cr: 0.01 to 2.0%.

(6)

The hot-rolled steel sheet according to (1), comprising a hot-dip galvanized layer or a galvannealed layer on its surface.

Advantageous Effects of Invention

According to the present invention, a hot-rolled steel sheet having excellent fatigue characteristics in the rolling direction and workability and having a tensile strength of 780 MPa or more can be provided. The present invention can be suitably applied to steel sheets with a sheet thickness of 8 mm or less. A hot-rolled steel sheet according to the present invention can prolong fatigue life of suspension parts and the like of automobile materials, thus significantly contributing to the industry.

BRIEF DESCRIPTION OF DRAWINGS

FIG. 1 is a schematic diagram illustrating the shape and dimensions of test pieces used for a fatigue test. FIG. 1(a) is a plan view and a front view of a test piece for measuring fatigue strength without a notch. FIG. 1(b) is a plan view and a front view of a test piece for measuring fatigue strength with a notch.

DESCRIPTION OF EMBODIMENTS

1. Microstructure of Hot-Rolled Steel Sheet 1-1. Area Fraction of Each Phase Constituting Hot-Rolled Steel Sheet A hot-rolled steel sheet of the present invention is required to contain bainite as the main constituent, and contain hard phases constituted by martensite and/or austenite in an amount of, in area fraction, equal to or more than 3% and less than 20%. When the microstructure is a composite structure having hard phases as a secondary phase in soft bainite serving as the main phase, the main phase improves ductility and the secondary phase improves strength, so that the steel sheet has a favorable balance between strength and ductility. Containing bainite as the main constituent means that bainite serving as the main phase in the hot-rolled steel sheet has the highest area fraction. Conventionally, steel sheets whose main phase is ferrite and secondary phase is the above-described hard phases have been widely used. Particularly when a strength of 780 MPa or more in tensile strength is required, bainite is used as the main phase in some cases. Furthermore, hard phases have an effect of obstructing fatigue crack propagation that occurs in a soft phase, to reduce a fatigue crack propagation rate; therefore, a steel sheet having the above-described composite structure has excellent punching fatigue characteristics. Hence, a hot-rolled steel sheet of the present invention is made to have a microstructure whose main constituent is bainite and in which hard phases constituted by martensite and/or austenite are distributed as a secondary phase. The area fraction of bainite is preferably 65 to 97%.

The hard phases exert the effect of inhibiting fatigue crack propagation when their area fraction is 3% or more. On the other hand, when the hard phases have an area fraction of 20% or more, the hard phases serve as a starting point of a defect called a void to reduce a hole expansion ratio, so that "(tensile strength (MPa))×(hole expansion ratio (%)) ≥35000", which is required of suspension parts of automobiles, is not satisfied. For this reason, hard phases constituted by martensite or austenite are made to be present in an amount of equal to or more than 3% and less than 20% in area fraction in a microstructure whose main constituent is bainite. The hard phases are preferably present in an amount of, in area fraction, 5% or more, further preferably 7% or more.

1-2. Aspect Ratio of Hard Phase Present in Sheet-Thickness Central Portion

Next, description is given on an aspect ratio of hard phases present in a sheet-thickness central portion. When a punching fatigue test is performed in an axial fatigue test, a fatigue crack occurs from the sheet-thickness central portion, and the crack propagates in the sheet thickness direction, resulting in rupture. Here, to inhibit the occurrence of a crack and initial propagation, the forms of the hard phases in the sheet-thickness central portion are particularly important.

An aspect ratio of a hard phase is defined by (the length of the major axis of the hard phase/the length of the minor axis of the hard phase). In a hot-rolled steel sheet of the present invention, "the length of the major axis of the hard phase" is "the length of the hard phase in the rolling direction of the steel sheet", and "the length of the minor axis of the hard phase" is "the length of the hard phase in the thickness direction of the steel sheet". With an increase in the aspect ratio of the hard phase, the frequency at which a crack hits the hard phase, which obstructs fatigue crack propagation, increases, and also the detouring/branching distance of the crack increases, which is effective in reducing a fatigue crack propagation rate. Here, a hard phase whose aspect ratio is less than 3 has a small effect of inhibiting crack propagation because the detouring/branching distance when a crack hits the hard phase is small. Therefore, it is effective to increase hard phases whose aspect ratio is 3 or more. For this reason, in the hot-rolled steel sheet of the present invention, hard phases with an aspect ratio of 3 or more are made to account for 60% or more of the hard phases present in the sheet-thickness central portion. The hard phases with an aspect ratio of 3 or more preferably account for 80% or more of the hard phases present in the sheet-thickness central portion.

1-3. Length in Rolling Direction of Hard Phases Present in Sheet-Thickness Central Portion Description will be given on the length in the rolling direction of the hard phases present in the sheet-thickness central portion. When steel with a composite structure containing bainite and hard phases are deformed, the bainite side, which is soft, preferentially undergoes plastic deformation, and accordingly stress on the hard phases increases with the deformation, so that great strain occurs at the interface between bainite and the hard phases.

When the stress on the hard phases or the strain at the interfaces between bainite and the hard phases exceed a certain degree, defects called voids occur in the steel, and these voids connect to each other, resulting in rupture. A material in which voids easily occur is vulnerable to local deformation and has low hole expandability.

When the hard phases extend in the rolling direction, stress and strain in deformation are concentrated on the hard phase, causing voids to occur early; thus, hole expandability is likely to deteriorate. In addition, in the sheet-thickness central portion, plastic constraint is stronger than in the surface layer portion, and thus voids easily occur. Therefore, the length of the hard phases in the sheet-thickness central portion is particularly important.

According to the study by the present inventors, when the length in the rolling direction of the hard phases present in the sheet-thickness central portion is controlled to less than 20 μm, the occurrence of voids can be inhibited, and "(tensile strength (MPa))×(hole expansion ratio (%)) ≥35000", which is required of suspension parts of automobiles, can be achieved. Hence, in a hot-rolled steel sheet of the present invention, the length in the rolling direction of the hard phase present in the sheet-thickness central portion is specified as less than 20 μm. The length in the rolling direction of the hard phases in the sheet-thickness central portion is preferably less than 18 μm.

The hard phases are constituted by martensite and/or austenite. That is, there are the following three forms: a hard phase containing only martensite, a hard phase containing only austenite, and a hard phase containing both martensite and austenite. The hard phase may be constituted by a single grain (martensite grain or austenite grain), or a plurality of grains may aggregate to integrally constitute the hard phase. Examples of a hard phase in which a plurality of grains aggregate include an aggregate of a plurality of martensite grains, an aggregate of a plurality of austenite grains, and an aggregate of one or a plurality of martensite grains and one or a plurality of austenite grains.

1-4. X-Ray Random Intensity Ratio

Description will be given on an X-ray random intensity ratio. Fatigue life of a notch-free material is greatly influenced by life until occurrence of a fatigue crack. The occurrence of a fatigue crack is known to proceed in a process of three steps: (1) saturation of a dislocation structure, (2) formation of intrusion and extrusion, and (3) formation of a fatigue crack.

As a result of extensive studies, the present inventors have found that by appropriately controlling crystal orientation in the stress loading direction in a fatigue test to make the X-ray random intensity ratio satisfy a predetermined condition, it is possible to delay (1) saturation of a dislocation structure of the process of three steps, and improve fatigue life of a notch-free material in the rolling direction. A mechanism for this is described below.

A crystal structure of iron is a body-centered cubic (b.c.c.) structure, and it is said that 42 slip systems of {110}<111> system, {112}<111> system, and {123}<111> system work. Notation of crystal orientation will be described later. In polycrystals, deformability varies depending on crystal orientation, and the degree of difficulty of deformation is decided by a Taylor factor. The Taylor factor is a value defined by formula (G).

$$d\Sigma\Gamma_i = Md\varepsilon \quad (G),$$

where $\Gamma_i$ denotes the amount of slip of a slip system i, $\Sigma\Gamma_i$ denotes the total sum of slip amounts of the whole slip that has worked, M denotes the Taylor factor, and ε denotes the whole plastic strain amount.

With a decrease in the Taylor factor, the whole plastic strain amount increases even when the total sum of slip amounts of the slip systems is small, which allows plastic deformation with small energy. The Taylor factor changes depending on crystal orientation with respect to the stress loading direction; thus, a crystal grain in an orientation with a small Taylor factor is easily deformed, and a crystal grain in an orientation with a large Taylor factor is difficult to deform.

Researchers have carried out calculation to reveal that, if the above-described 42 slip systems are assumed in b.c.c. metal, values of Taylor factors when <001> orientation, <011> orientation, and <111> orientation are subjected to tensile deformation are 2.1, 3.2, and 3.2, respectively, and <001> orientation is deformed most easily, which leads to early formation of a dislocation structure. In contrast, <011> orientation and <111> orientation are difficult to deform, which leads to late formation of a dislocation structure. That is, a crystal grain facing <001> orientation with respect to the stress loading direction has a short fatigue crack initiation life, and crystal grains facing <011> orientation and <111> orientation have a long fatigue crack initiation life.

The present inventors have found as a result of study that, when the sum of X-ray random intensity ratios of <011> orientation and <111> orientation as viewed from the rolling direction is controlled to 3.5 or more and an X-ray random intensity ratio of <001> orientation as viewed from the rolling direction is controlled to 1.0 or less, fatigue characteristics in the rolling direction exhibit a favorable value of (fatigue limit)/(tensile strength) of 0.55 or more. "Fatigue limit" here refers to fatigue strength at 10 million cycles obtained with a notch-free fatigue test piece, which is described later.

On the basis of this finding, in a hot-rolled steel sheet of the present invention, the sum of X-ray random intensity ratios of <011> orientation and <111> orientation as viewed from the rolling direction is set to 3.5 or more, and an X-ray random intensity ratio of <001> orientation as viewed from the rolling direction is set to 1.0 or less. The sum of X-ray random intensity ratios of <011> orientation and <111> orientation as viewed from the rolling direction is preferably 4.0 or more. An X-ray random intensity ratio of <001> orientation as viewed from the rolling direction is preferably 0.8 or less.

1-5. Method for Measuring Microstructure of Hot-Rolled Steel Sheet and X-Ray Random Intensity (1) Method for Measuring Area Fractions of Bainite and Hard Phases The area fractions of bainite and hard phases constituted by martensite and/or austenite, which constitute the structure of a hot-rolled steel sheet of the present invention as described above, are measured by using a sample obtained by taking, as an observation surface, a cross-section perpendicular to the width direction of the steel sheet. The observation surface of the sample is polished and subjected to nital etching. Ranges of ¼ thickness (This means a position at ¼ of the thickness of the steel sheet in the thickness direction of the steel sheet from the surface of the steel sheet. The same applies to the following.), ⅜ thickness, and ½ thickness of the sheet thickness of the observation surface subjected to nital etching are observed with a FE-SEM.

For an observation target range of each sample, ten fields of view are observed at a 1000-fold magnification, and in each field of view, the proportions of areas occupied by bainite and the hard phases are measured. The area of the hard phases is the total area of martensite and austenite. Then, the average values of the proportions of areas occupied by bainite and the hard phases of all fields of view are obtained as the area fractions of bainite and the hard phases. This method can be used to measure the area fraction of ferrite or the like, as well as bainite, and martensite and austenite (hard phases).

(2) Aspect Ratio and Length in Rolling Direction of Hard Phases Present in Sheet-Thickness Central Portion The aspect ratio and the length in the rolling direction of the hard phases present in the sheet-thickness central portion are determined regarding hard phases located at ½ thickness of the sheet thickness in the above-described sample. 50 or more hard phases located at ½ thickness of the sheet thickness in the above-described sample are observed using a FE-SEM, and the length in the steel sheet rolling direction and the length in the steel sheet thickness direction of each hard phase are measured. From the measurement results of these lengths, an aspect ratio of each hard phase is calculated. The proportion of hard phases with an aspect ratio of 3 or more among the observed hard phases is calculated. In addition, the average value of the lengths in the rolling direction of the observed hard phases is obtained as the length in the rolling direction of the hard phase present in the sheet-thickness central portion.

The sheet-thickness central portion refers to a position at ½ of the thickness of the steel sheet in the thickness direction of the steel sheet from the surface of the steel sheet. For example, in the sheet-thickness central portion, any 50 hard phases in a field-of-view range of 50 μm×200 μm are selected, and the length in the rolling direction and the length in the steel sheet thickness direction of each hard phase are measured. To increase measurement precision, instead of selecting any 50 hard phases, the length in the rolling direction and the length in the thickness direction may be measured for all of the hard phases in the field-of-view range.

(3) X-Ray Random Intensity Ratio

X-ray random intensity ratios of <001> orientation, <011> orientation, and <111> orientation as viewed from the rolling direction may be determined from an inverse pole figure measured by X-ray diffraction. An X-ray random intensity ratio is a value obtained in the following manner: X-ray intensities of a standard sample without integration in a particular orientation and a sample are measured under the same conditions by X-ray diffraction or the like, and the X-ray intensity of the sample is divided by the X-ray intensity of the standard sample.

Here, for a hot-rolled steel sheet, crystal orientation perpendicular to the sheet surface is normally denoted by [hkl] or {hkl}, and crystal orientation parallel to the rolling direction is normally denoted by (uvw) or <uvw>. {hkl} and <uvw> collectively refer to equivalent planes, and [hkl] and (uvw) refer to individual crystal planes. In the present invention, which is targeted at a hot-rolled steel sheet whose main constituent is bainite including ferrite with a b.c.c. structure, for example, (111), (−111), (1-11), (11-1), (−1-11), (−11-1), (1-1-1), and (−1-1-1) planes are equivalent and undistinguishable. In such a case, these orientations are collectively referred to as <111>. In crystallography, as for "−1", "−" is put above "1" in the formal notation of orientation, but here, "−1" is used for notation because of constraints in description.

A sample for X-ray diffraction is fabricated in the following manner. A rolling-direction cross-section (a cross-section perpendicular to the rolling direction) of the steel sheet is polished by mechanical polishing, chemical polishing, or the like and mirror-finished by buffing, and then strain is removed by electrolytic polishing, chemical polishing, or the like. The range of X-ray diffraction is the whole sheet thickness. If the whole sample cannot be measured at once, measurement may be performed with the sheet thickness direction divided into several fields of view, and the results may be averaged. If measurement by X-ray diffraction is difficult, a statistically sufficient number of samples may be measured by an electron back scattering pattern (EBSP) method or an electron channeling pattern (ECP) method, and an X-ray diffraction random intensity ratio of each orientation may be determined.

2. Chemical Composition of Steel Sheet

A hot-rolled steel sheet of the present invention has a chemical composition containing the following elements. Hereinafter, the elements will be described along with the reasons for confining the contents of the elements. In the description, "%" of the content of each element means "mass %".

C: 0.03 to 0.2%

Carbon (C) is an important element in the present invention. C generates martensite and stabilizes austenite, thus contributing to strength improvement of the hot-rolled steel sheet by structure strengthening, and also has an effect of inhibiting crack propagation. Note that a C content less than 0.03% does not allow a predetermined volume fraction of the hard phases to be achieved; thus, an effect of improving punching fatigue characteristics is not exhibited. On the other hand, a C content exceeding 0.2% leads to an excessive area fraction of a low-temperature transformation product constituting the hard phases serving as a secondary phase, which reduces hole expandability. Accordingly, the C content is set to 0.03% to 0.2%. The lower limit of the C content is preferably 0.06%, and the upper limit is preferably 0.18%.

Mn: 0.1 to 3.0%

Manganese (Mn) is contained for solid solution strengthening and also in order to increase hardenability to generate martensite or austenite in the steel sheet structure. A Mn content exceeding 3% saturates this effect. On the other hand, a Mn content less than 0.1% makes it difficult to exert an effect of inhibiting generation of pearlite during cooling. Accordingly, the Mn content is set to 0.1 to 3.0%. The lower limit of the Mn content is preferably 0.3%, and the upper limit is preferably 2.5%.

P: 0.10% or Less

Phosphorus (P), which is an impurity contained in hot metal, is segregated at a grain boundary and reduces low-temperature toughness along with an increase in its content. Therefore, the P content is preferably as low as possible. A P content exceeding 0.10% adversely affects workability and weldability. Accordingly, the P content is set to 0.10% or less. Particularly in terms of weldability, the upper limit of the P content is preferably 0.03%.

S: 0.03% or Less

Sulfur (S), which is an impurity contained in hot metal, when contained too much, causes a crack in hot rolling and also generates an inclusion, such as MnS, which causes hole expandability to deteriorate. Therefore, the S content should be reduced as far as possible, whereas 0.03% or less is an allowable range. Accordingly, the S content is set to 0.03% or less. Note that when a certain degree of hole expandability is needed, the upper limit of the S content is preferably 0.01%, further preferably 0.005%.

Si+Al: 0.2 to 3.0%

Silicon (Si) and aluminum (Al) are both important elements in the present invention. Si and Al has an effect of inhibiting {112}<111> slip in the iron, thus delaying formation of a dislocation structure to improve fatigue crack initiation life. This effect is obtained at a total content of Si and Al (Si+Al) of 0.2% or more, and is significant at 0.5% or more. Si+Al exceeding 3.0% saturates the effect and leads to poor economic efficiency. Accordingly, Si+Al is set to 0.2 to 3.0%. The lower limit of Si+Al is preferably 0.5%. The Al content in the present invention refers to acid-soluble Al (so-called "sol.Al"). Only one of Si and Al may be contained in an amount of 0.2 to 3.0%, or both Si and Al may be contained in a total amount of 0.2 to 3.0%.

N: More than 0% and Equal to or Less than 0.01%

Nitrogen (N), when present in steel as TiN, contributes to an improvement in low-temperature toughness by making a crystal grain size finer in slab heating. Therefore, N may be contained. Note that an N content more than 0.01% may cause a blowhole to be formed in welding of a steel sheet to reduce joint strength of a weld. Accordingly, the N content is set to 0.01% or less. On the other hand, an N content less than 0.0001% is not preferable in terms of economic efficiency. Therefore, the lower limit of the N content is preferably 0.0001% or more, further preferably 0.0005%.

O: More than 0% and Equal to or Less than 0.01%

Oxygen (O) forms oxide, which causes formability to deteriorate; hence, its content needs to be suppressed. In particular, an O content exceeding 0.01% leads to significant deterioration of formability. Accordingly, the O content is set to 0.01% or less. On the other hand, an O content less than 0.001% is not preferable in terms of economic efficiency. Therefore, the lower limit of the O content is preferably 0.001% or more.

Ti: 0 to 0.3%

Nb: 0 to 0.3%

Titanium (Ti) achieves both excellent low-temperature toughness and high strength due to precipitation strengthening. Therefore, Ti may be contained as necessary. Carbonitride of Ti or solid solution Ti delays grain growth in hot rolling, which makes a grain size of the hot-rolled steel sheet finer and contributes to an improvement in low-temperature toughness. However, a Ti content exceeding 0.3% saturates this effect and leads to poor economic efficiency. Accordingly, the Ti content is set to 0 to 0.3%. In addition, a Ti content less than (0.005+48/14[N]+48/32[S])% may be unable to provide this effect sufficiently. Hence, the Ti content is preferably equal to or more than 0.005+48/14[N]+48/32[S] (%) and equal to or less than 0.3%. Here, [N] and [S] denote the N content (%) and the S content (%), respectively. Furthermore, a Ti content exceeding 0.15% may cause a tundish nozzle to be clogged up easily in casting. Hence, the upper limit of the Ti content is preferably 0.15%.

Niobium (Nb) improves low-temperature toughness of a hot-rolled steel sheet. Therefore, Nb may be contained as necessary. Carbonitride of Nb or solid solution Nb delays grain growth in hot rolling, which makes a grain size of the hot-rolled steel sheet finer and contributes to an improvement in low-temperature toughness. However, a Nb content exceeding 0.3% saturates this effect and leads to poor economic efficiency. Accordingly, the Nb content is set to 0 to 0.3%. In addition, a Nb content less than 0.01% may be unable to provide this effect sufficiently. Therefore, the lower limit of the Nb content is preferably 0.01%, and the upper limit is preferably 0.1%.

Mg: 0 to 0.01%

Ca: 0 to 0.01%

REM: 0 to 0.1%

Magnesium (Mg), calcium (Ca), and rare earth metal (REM) control the form of a non-metallic inclusion, which serves as a starting point of breaking to cause deterioration of workability, and thus improve workability. Therefore, one or more of these elements may be contained as necessary. However, an Mg content exceeding 0.01%, a Ca content exceeding 0.01%, or a REM content exceeding 0.1% saturates this effect and leads to poor economic efficiency. Accordingly, the Mg content is set to 0 to 0.01%, the Ca content is set to 0 to 0.01%, and the REM content is set to 0 to 0.1%. When Mg, Ca, and REM are each contained in an amount of 0.0005% or more, the above effect is significantly exhibited. Therefore, the lower limit of the Mg content is preferably 0.0005%, the lower limit of the Ca content is preferably 0.0005%, and the lower limit of the REM content is preferably 0.0005%. Note that REM collectively refers to 17 elements in total, including Sc, Y, and lanthanoid, and the REM content means the total amount of these elements.

B: 0 to 0.01%

B is segregated at a grain boundary and increases grain boundary strength to improve low-temperature toughness. Therefore, B may be contained in the steel sheet as necessary. However, a B content exceeding 0.01% not only saturates this effect but also leads to inferior economic efficiency. Accordingly, the B content is set to 0 to 0.01%. The above effect is significant when the steel sheet has a B content of 0.0002% or more. Therefore, the lower limit of the B content is preferably 0.0002%, further preferably 0.0005%. The upper limit of the B content is preferably 0.005%, further preferably 0.002%.

Cu: 0 to 2.0%

Ni: 0 to 2.0%

Mo: 0 to 1.0%

V: 0 to 0.3%

Cr: 0 to 2.0%

Copper (Cu), nickel (Ni), molybdenum (Mo), vanadium (V), and chromium (Cr) have an effect of improving the strength of a hot-rolled steel sheet by precipitation strengthening or solid solution strengthening. Therefore, one or more of these elements may be contained as necessary. However, a Cu content exceeding 2.0%, a Ni content exceeding 2.0%, a Mo content exceeding 1.0%, a V content exceeding 0.3%, or a Cr content exceeding 2.0% saturates this effect and leads to poor economic efficiency. Accordingly, the Cu content is set to 0 to 2.0%, the Ni content is set to 0 to 2.0%, the Mo content is set to 0 to 1.0%, the V content is set to 0 to 0.3%, and the Cr content is set to 0 to 2.0%. When Cu, Ni, Mo, V, and Cu are each contained in an amount of less than 0.01%, this effect is not provided sufficiently. Therefore, the lower limit of the Cu content is preferably 0.01%, further preferably 0.02%. The lower limit of the Ni content is preferably 0.01%, the lower limit of the Mo content is preferably 0.01%, the lower limit of the V content is preferably 0.01%, and the lower limit of the Cr content is preferably 0.01%. In addition, the upper limit of the Cu content is preferably 1.2%, the upper limit of the Ni content is preferably 0.6%, the upper limit of the Mo content is preferably 0.7%, the upper limit of the V content is preferably 0.2%, and the upper limit of the Cr content is preferably 1.2%.

Described above is a basic chemical composition of a hot-rolled steel sheet of the present invention. The balance of the chemical composition of the hot-rolled steel sheet of the present invention consists of iron and impurities. Impurities mean components that are mixed in due to raw materials, such as ores or scrap, or other factors when a steel material is produced industrially.

It has been confirmed that, as an element other than the above elements, one or more of Zr, Sn, Co, Zn, and W may be contained in a total amount of 1% or less, instead of part of iron, without impairment of the excellent fatigue characteristics in the rolling direction and workability and the tensile strength of 780 MPa or more of the hot-rolled steel sheet of the present invention. Among these elements, Sn may cause a flaw in hot rolling; hence, the upper limit of the Sn content is preferably 0.05%.

A hot-rolled steel sheet of the present invention having the above-described structure and composition can have improved corrosion resistance by comprising, on the surface, a hot-dip galvanized layer formed by hot dip galvanizing and a galvannealed layer formed by alloying after plating. The plating layer is not limited to pure zinc, and may contain elements such as Si, Mg, Al, Fe, Mn, Ca, and Zr for further improved corrosion resistance. Comprising this plating layer does not impair the excellent punching fatigue characteristics and workability of the hot-rolled steel sheet of the present invention.

Moreover, a hot-rolled steel sheet of the present invention may comprise a surface-treating layer formed by any of formation of an organic film, film laminating, organic salts/inorganic salts treatment, non-chromium treatment, and the like, and still achieve an effect of the present invention.

3. Method for Producing Hot-Rolled Steel Sheet of the Present Invention

A method for producing a hot-rolled steel sheet is not particularly limited, as long as a hot-rolled steel sheet having the aforementioned microstructure is obtained. For example, a production method comprising the following steps [a] to [h] allows a hot-rolled steel sheet of the present invention to be obtained stably. Hereinafter, details of each step will be described as an example.

[a] Slab Casting Step

There is no particular limitation on a method for producing a slab prior to hot rolling. That is, subsequent to production of ingot steel using a blast furnace, an electric furnace, or the like, various kinds of secondary smelting may be performed for adjustment to the above-described chemical composition, and then, a slab may be casted by a normal method, such as continuous casting or thin slab casting. On this occasion, scrap may be used as a raw material as long as a component range of the present invention can be obtained by control.

[b] Slab Heating Step

The casted slab is heated to a predetermined temperature for hot rolling. In the case of continuous casting, the slab may be once cooled to a low temperature and then heated again and subjected to hot rolling, or may be directly heated and subjected to hot rolling subsequent to continuous casting without being cooled. Heating time for the slab is equal to or more than time $t_1(s)$ specified in formula (A).

$$t_1(s)=1.4\times10^{-6}\times\mathrm{Exp}\{3.2\times10^{4}/(T_1+273)\} \tag{A}$$

where $T_1$ (° C.) is the average temperature of the slab in a soaking area.

The heating time is thus specified for the following reason. In the structure of the casted slab, segregation of Mn is present in the center of the slab. Therefore, when the slab is not sufficiently heated, segregation of Mn remains in a sheet-thickness central portion of a hot-rolled steel sheet obtained by rolling. Since Mn stabilizes austenite, a region in which austenite is likely to remain along the Mn segregation occurs during cooling after the rolling. Consequently, martensite into which austenite has been transformed at low temperature or remaining austenite is likely to be present along the Mn segregation, which increases the length in the rolling direction of the hard phases in the sheet-thickness central portion of the hot-rolled steel sheet.

As a result of extensive studies, the present inventors have found that in order to make the length in the rolling direction of the hard phases 20 μm or less, it is necessary to set the heating time for the slab to time $t_1(s)$, specified in formula (A), or more. Presumably, sufficiently long heating time for the slab promotes diffusion of Mn, reducing the length in the rolling direction of the hard phases. An effect of the present invention is exerted even when the upper limit of the slab heating temperature is not set, but excessively high heating temperature is not preferable in terms of economic efficiency. Hence, the slab heating temperature is preferably lower than 1300° C. The lower limit of the slab heating temperature is preferably 1150° C. The heating time for the slab is not the elapsed time from heating start, but time during which the slab is held at a predetermined heating temperature (e.g., a temperature equal to or higher than 1150° C. and lower than 1300° C.).

[c] Rough Rolling Step

After the slab heating step, a rough rolling step of hot rolling starts to be performed without a wait on the slab extracted from a heating furnace; thus, a rough bar is obtained. In the rough rolling step, the total reduction ratio during rough rolling is set to 50% or more, and a slab surface layer is cooled to $Ar_3$ transformation point, expressed by formula (B) below, or lower twice or more, preferably three times or more, during rough rolling. Specifically, the rough rolling step is performed as multi-pass hot rolling, and a surface layer of the slab that has gone through the previous pass is once cooled to $Ar_3$ transformation point or lower and then recuperated to a temperature higher than $Ar_3$ transformation point. The slab whose surface layer has been recuperated is rolled in a subsequent pass, and a surface layer of the slab is cooled again to $Ar_3$ transformation point or lower. This process is repeated. The temperature of the slab surface layer in the present invention refers to the temperature of the slab in a portion at 1 mm in the depth direction from the slab surface, and can be estimated by thermal transfer calculation, for example. Cooling the inside of the slab as well as the slab outermost surface to $Ar_3$ transformation point or lower increases the effect of recuperation.

$$Ar_3(° \text{C.})=901-325\times C+33\times Si+287\times P+40\times Al-92\times(Mn+Mo+Cu)-46\times Ni \tag{B}$$

where each chemical symbol denotes the content (mass %) of the element.

The rough rolling conditions are thus specified for the following reason. To obtain an effect of the present invention of obtaining a hot-rolled steel sheet with favorable fatigue characteristics in the rolling direction, it is essential that, in the hot-rolled steel sheet, the sum of X-ray random intensity ratios of <011> orientation and <111> orientation as viewed from the rolling direction be 3.5 or more, and an X-ray random intensity ratio of <001> orientation as viewed from the rolling direction be 1.0 or less. To thus control crystal orientation, it is important to make shear force act on the steel sheet to develop <011> orientation and <111> orientation as strongly as possible so that they reach a portion close to the center of the sheet thickness. The influence of a structure formed by the action of shear force during rough rolling is normally eliminated by recrystallization after rough rolling. The study by the present inventors, however, has revealed that when the slab surface layer is once cooled to $Ar_3$ transformation point or lower during rough rolling, the structure during rough rolling exerts a preferable influence on a final structure. A presumable mechanism is described below.

When sufficient shear force is applied during rough rolling and the slab surface layer is once cooled to $Ar_3$ transformation point or lower, the structure around the surface layer is partly transformed from austenite to ferrite. At this time, ferrite is influenced by the shear force during rough rolling; thus, as viewed from the rolling direction, <111> orientation and <011> orientation increase and <001> orientation decreases.

Ferrite in the surface layer is recuperated and reversely transformed to austenite by the next pass. On this occasion, austenite that has undergone reverse transformation has an orientation having a certain orientation relationship with the crystal orientation of ferrite before transformation. When the surface layer austenite after reverse transformation is further subjected to rough rolling and cooled again to $Ar_3$ transformation point or lower, the surface layer structure is partly transformed from austenite to ferrite again. The crystal orientation of austenite before transformation is influenced by the crystal orientation of former ferrite; thus, <111> orientation and <011> orientation of ferrite after transformation further increase as compared with after the previous pass.

In this manner, during rough rolling, applying sufficient shear force in each pass and transforming a surface layer by cooling to $Ar_3$ transformation point or lower are repeated; thus, near the surface layer, <111> orientation and <011> orientation increase and <001> orientation decreases. To sufficiently exert this effect, it is necessary to set the reduction ratio during rough rolling to 50% or more to apply sufficient shear force; hence, in this step, the slab surface layer is cooled to $Ar_3$ transformation point or lower twice or more, preferably three times or more.

[d] Finish Rolling Step

In a finish rolling step following the rough rolling step, two passes or more of rolling in which a shape ratio X, determined from formula (C) below, is 2.3 or more are performed at a slab surface layer temperature of 1100° C. or lower to make the total reduction ratio 40% or more.

[Math. 1]

$$X = \frac{\sqrt{\frac{L \times (h_{in} - h_{out})}{2}}}{\frac{(h_{in} + h_{out})}{2}} \quad (C)$$

where L denotes the diameter of a rolling mill roll, $h_{in}$ denotes the sheet thickness on the rolling mill roll entry side, and $h_{out}$ denotes the sheet thickness on the rolling mill roll exit side.

The present inventors have found that, to make shear force of hot rolling act on the steel sheet deeply by rolling at 1100° C. or lower, it is necessary to satisfy a shape ratio X, specified in formula (C), of 2.3 or more in at least two passes of the total number of passes of hot rolling. As expressed by formulae (C1) to (C3) below, the shape ratio X is a ratio between contact arc length $l_d$ and average sheet thickness $h_m$ of the rolling mill roll and the steel sheet.

$$X = l_d/h_m \quad (C1)$$

$$l_d = (L \times (h_{in} - h_{out})/2)^{1/2} \quad (C2)$$

$$h_m = (h_{in} + h_{out})/2 \quad (C3)$$

Even if the shape ratio X determined from formula (C) is 2.3 or more, one pass of rolling is not enough for sufficient introduction depth of shear strain. When the introduction depth of shear strain is insufficient, alignment of ferrite in <111> orientation and <011> orientation as viewed from the rolling direction is weak, which results in a reduction in fatigue characteristics in the rolling direction. Accordingly, the number of passes in which the shape ratio X is 2.3 or more is set to two or more.

The number of passes of rolling in the finish rolling step is preferably as large as possible. When the number of passes is three or more, the shape ratio X may be set to 2.3 or more in all passes. To increase the thickness of a shear layer, the value of the shape ratio X is preferably as large as possible. The value of the shape ratio X is preferably 2.5 or more, further preferably 3.0 or more.

When rolling in which the shape ratio X is 2.3 or more is performed at high temperature, subsequent recrystallization may break textures increasing Young's modulus. Hence, rolling in which the number of passes in which the shape ratio X is set to 2.3 or more is confined is performed in a state where the slab surface layer temperature is 1100° C. or lower. In addition, a larger amount of introduction of shear strain leads to further development of crystal grains in <111> orientation and <011> orientation as viewed from the rolling direction, which improve fatigue characteristics in the rolling direction of the steel sheet. This effect is significant when the total reduction ratio at 1100° C. or lower is 40% or more; hence, the total reduction ratio at 1100° C. or lower is set to 40% or more.

Reduction in the final pass of finish rolling is performed at equal to or higher than $(T_2-100)$ ° C. and lower than $(T_2+20)$ ° C., preferably equal to or higher than $(T_2-100)$ ° C. and lower than $T_2$ (° C.), and the reduction ratio is set to equal to or more than 3% and less than 40%. The reduction ratio is preferably equal to or more than 10% and less than 40%. $T_2$ is a temperature specified in formula (D) below.

$$T_2(° C.)=870+10\times(C+N)\times Mn+350\times+250\times Ti+40\times B+10\times Cr+100\times Mo+100\times V \quad (D),$$

where each chemical symbol denotes the content (mass %) of the element.

Reduction conditions in this final pass are very important in controlling an aspect ratio of the hard phases in the sheet-thickness central portion. Performing rolling in a temperature range of equal to or higher than $(T_2-100)$ ° C. and lower than $(T_2+20)$ ° C. increases the aspect ratio of the hard phases in the sheet-thickness central portion, presumably because rolling in a state where recrystallization is inhibited increases the aspect ratio of austenite, and the shapes are inherited by the hard phases. To exert this effect of increasing the aspect ratio of the hard phases, it is necessary to set the reduction ratio in the final reduction to 3% or more. Rolling with a reduction ratio of 40% or more puts a great burden on a rolling mill; hence, a reduction ratio equal to or more than 3% and less than 40% is preferable.

If reduction in the final pass is performed in a temperature range of lower than $(T_2-100)$ ° C., rolling proceeds in a dual-phase region of ferrite and austenite. Thus, generation of ferrite is promoted by strain-induced transformation, so that bainite does not serve as the main constituent of the microstructure. Moreover, in this case, generated ferrite is unrecrystallized ferrite with low ductility, and thus the steel sheet has low ductility and does not satisfy (tensile strength (MPa))×(total elongation (%))≥18000. If reduction in the final pass is performed in a temperature range of $(T_2+20)$ ° C. or higher, the aspect ratio of the hard phases in the sheet-thickness central portion is small. This is presumably because promotion of recrystallization of austenite, resulting in reduced aspect ratio of austenite, influences the form of the hard phases. Hence, reduction in the final pass is performed in a temperature range of equal to or higher than $(T_2-100)$ ° C. and lower than $(T_2+20)$ ° C. Reduction under these conditions makes the aspect ratio of the hard phases 3 or more.

[e] First Cooling Step

In a first cooling step following the finish rolling step, the average cooling rate from the final reduction temperature of finish rolling to 750° C. is set to 60° C./s or more, because a cooling rate less than 60° C./s may cause the length in the sheet thickness direction of the hard phases in the sheet-thickness central portion to be 20 μm or more. Although the cause of the correlation between cooling rate and the length in the sheet thickness direction of the hard phases is uncertain, there is a possibility that a cooling rate of 60° C./s or more makes it difficult for dislocation introduced in the final reduction of finish rolling to recover, and the dislocation works as the core of ferrite transformation; thus, untransformed austenite in the sheet-thickness central portion is divided by ferrite, which results in a reduction in the length in the sheet thickness direction of the hard phases.

In the field of steel plates, there has been an example aiming at inhibition of fatigue crack propagation by control of an aspect ratio of hard phases, but no document has reported achievement of both the inhibition of fatigue crack propagation and workability such as hole expandability, probably for the following reasons. In the field of steel plates, rolling strain does not easily reach a plate-thickness central portion. In addition, because of thick plate thickness, cooling rate in the plate-thickness central portion is not enough, so that recovery of dislocation proceeds; consequently, the core of ferrite transformation cannot be introduced sufficiently, which prevents a reduction in the length of the hard phases.

[f] Second Cooling Step

In a second cooling step following the first cooling step, with regard to a temperature $T_3$(° C.) specified in formula (E) below, the average cooling rate in a temperature range of equal to or higher than $T_3$(° C.) and lower than 750° C. is set to 50° C./s or more for the following reason. An average cooling rate of less than 50° C./s leads to large ferrite transformation quantity during cooling, so that bainite does not serve as the main constituent of the microstructure; thus, the hot-rolled steel sheet cannot have a tensile strength of 780 MPa or more.

$$T_3(° C.)=830-270\times C-90\times Mn-37\times Ni-70\times Cr-83\times Mo \quad (E),$$

where each chemical symbol denotes the content (mass %) of the element. When the content of an element in formula (E) is zero, zero is substituted.

[g] Soaking Step

In a soaking step following the second cooling step, with regard to the temperature $T_3$(° C.) specified in formula (E) and a temperature $T_4$(° C.) specified in formula (F) below, the steel sheet is held for 5 s or more in a temperature range of equal to or higher than $T_3$(° C.) and lower than $T_4$(° C.). The soaking step is essential to making bainite serve as the main constituent of the microstructure. The holding time is set to 5 s or more because holding time of 5 s or less makes an area fraction of the hard phases 20% or more, which reduces ductility and a hole expansion ratio.

$$T_4(° C.)=561-474\times C-33\times Mn-17\times Ni-17\times Cr-21\times Mo \quad (F),$$

where each chemical symbol denotes the content (mass %) of the element. When the content of an element in formula (F) is zero, zero is substituted.

[h] Winding Step

The steel sheet is wound after the soaking step. The temperature of the steel sheet in winding (winding temperature) is set to $T_4$(° C.), specified in formula (F), or lower. Winding at a high temperature exceeding $T_4$(° C.) leads to an excessive volume fraction of bainite in the structure, making it difficult to obtain enough fraction of the hard phases, which causes punching fatigue characteristics to deteriorate.

Through the production steps described above, a hot-rolled steel sheet of the present invention is produced.

After the completion of all of the steps [a] to [h], for the purpose of correcting the shape of the steel sheet, or of improving ductility by introducing mobile dislocation, or the like, skin pass rolling in which a reduction ratio is equal to or more than 0.1% and equal to or less than 2% is preferably performed. In addition, after the completion of all of the steps, for the purpose of removing scales attached on the surface of the obtained hot-rolled steel sheet, pickling may be performed on the obtained hot-rolled steel sheet as necessary. Furthermore, after pickling, skin pass rolling or cold rolling in which a reduction ratio is 10% or less may be performed on the obtained hot-rolled steel sheet in-line or off-line.

A hot-rolled steel sheet of the present invention is produced through, in addition to the rolling steps, continuous casting, pickling, and the like, which are normal hot-rolling steps; however, even if produced with the steps partly skipped, the hot-rolled steel sheet can have excellent fatigue in the rolling direction characteristics and workability, which are effects of the present invention.

Moreover, even if, after the hot-rolled steel sheet is once produced, heat treatment is performed on-line or off-line in a temperature range of 100 to 600° C. for the purpose of improving ductility, the hot-rolled steel sheet can have excellent fatigue characteristics in the rolling direction and workability, which are effects of the present invention.

The hot-rolled steel sheet produced through the above steps may be subjected to an additional step, such as performing hot dip galvanizing or alloyed hot dip galvanizing, or performing surface treatment by formation of an organic film, film laminating, organic salts/inorganic salts treatment, non-chromium treatment, and the like.

4. Method for Evaluating Characteristics of Hot-Rolled Steel Sheet (1) Tensile Strength Characteristics Of mechanical properties of a hot-rolled steel sheet, tensile strength characteristics (tensile strength and total elongation) are evaluated in conformance with JIS Z 2241 2011. A test piece is No. 5 test piece of JIS Z 2241 2011, taken from a ¼ W (This means a position at ¼ of the width of the steel sheet in the width direction of the steel sheet from the end portion in the width direction of the steel sheet. The same applies to the following.) or ¾ W position of the sheet width of the steel sheet with the rolling direction serving as the longitudinal direction.

(2) Hole Expansion Ratio

A hole expansion ratio of a hot-rolled steel sheet is evaluated by a hole expansion test in conformance with a test method described in the Japan Iron and Steel Federation Standard JFS T 1001-1996. A test piece is taken from a position similar to that of the tensile test piece, and is provided with a punching hole by a cylindrical punch. A steel sheet with excellent workability in the present invention refers to a steel sheet that satisfies (tensile strength (MPa))×(total elongation (%))≥18000 and (tensile strength (MPa))×(hole expansion ratio (%))≥35000.

(3) Fatigue Characteristics

FIG. 1 is a schematic diagram illustrating the shape and dimensions of test pieces used for a fatigue test. FIG. 1(a) is a plan view and a front view of a test piece for measuring fatigue strength without a notch. FIG. 1(b) is a plan view and a front view of a test piece for measuring fatigue strength with a notch.

To evaluate fatigue characteristics in the rolling direction of a hot-rolled steel sheet, test pieces with the shape and dimensions illustrated in FIG. 1 are used. Each test piece is taken from a position similar to that of the tensile test piece with the rolling direction serving as the longitudinal direction. The test piece illustrated in FIG. 1(a) is a test piece for obtaining fatigue strength without a notch. The test piece illustrated in FIG. 1(b) is a punched test piece for obtaining fatigue strength of a notched material, and is provided with a punching hole 1 by a cylindrical punch like the hole expansion test piece in order to allow evaluation close to fatigue characteristics evaluation in actual use of automobile parts. A punching clearance is set to 10%. Both fatigue test pieces are subjected to grinding for three triangle finish (expressed by surface roughness finish symbols) from the outermost layer to a depth of approximately 0.05 mm.

Using these test pieces, a stress controlled tensile-tensile fatigue test is performed under conditions of a stress ratio R of 0.1 and a frequency of 15 to 25 Hz. A steel sheet with excellent fatigue characteristics in the rolling direction in the present invention refers to a steel sheet whose value (fatigue limit ratio) obtained by dividing fatigue strength at 10 million cycles obtained with the notch-free fatigue test piece by tensile strength obtained in the tensile test is 0.55 or more, and whose value (punching fatigue limit ratio) obtained by dividing fatigue strength at 10 million cycles obtained in the punching fatigue test by tensile strength obtained in the tensile test is 0.30 or more.

Hereinafter, the present invention will be described more specifically in Examples. Note that the present invention is not limited by the following Examples.

EXAMPLES

Molten steel having chemical compositions shown in Table 1 was produced.

TABLE 1

| | Chemical components (mass %) | | | | | | | | | | | | |
|---|---|---|---|---|---|---|---|---|---|---|---|---|---|
| Steel | C | Si | Mn | P | S | Al | N | O | Ti | Nb | Others | Si + Al | Remarks |
| A | 0.047 | 1.03 | 1.49 | 0.018 | 0.0031 | 0.07 | 0.0028 | 0.0013 | 0.053 | 0.012 | — | 1.10 | Invention steel |
| B | 0.123 | 0.01 | 1.37 | 0.023 | 0.0022 | 1.03 | 0.0024 | 0.0011 | 0.000 | 0.011 | — | 1.04 | Invention steel |
| C | 0.064 | 0.00 | 1.68 | 0.010 | 0.0028 | 0.22 | 0.0043 | 0.0021 | 0.105 | 0.016 | — | 0.22 | Invention steel |
| D | 0.073 | 1.68 | 0.51 | 0.016 | 0.0019 | 0.03 | 0.0034 | 0.0019 | 0.064 | 0.024 | B = 0.0006 | 1.71 | Invention steel |
| E | 0.070 | 1.30 | 2.07 | 0.025 | 0.0034 | 0.54 | 0.0040 | 0.0013 | 0.000 | 0.011 | Cu = 0.17 | 1.84 | Invention steel |
| F | 0.067 | 1.16 | 2.13 | 0.032 | 0.0027 | 0.26 | 0.0018 | 0.0014 | 0.012 | 0.000 | REM = 0.001 | 1.42 | Invention steel |
| G | 0.089 | 0.91 | 1.78 | 0.024 | 0.0076 | 0.03 | 0.0023 | 0.0024 | 0.011 | 0.013 | Mo = 0.21 | 0.94 | Invention steel |
| H | 0.062 | 1.24 | 1.94 | 0.015 | 0.0012 | 1.46 | 0.0020 | 0.0011 | 0.012 | 0.011 | V = 0.08 | 2.70 | Invention steel |
| a | <u>0.016</u> | 1.24 | 2.01 | 0.011 | 0.0035 | 0.03 | 0.0012 | 0.0021 | 0.012 | 0.000 | — | 1.27 | Comparativesteel |
| b | <u>0.254</u> | 1.20 | 1.85 | 0.015 | 0.0017 | 0.03 | 0.0024 | 0.0023 | 0.000 | 0.130 | — | 1.23 | Comparativesteel |
| c | 0.072 | 1.13 | 1.99 | <u>0.133</u> | 0.0032 | 0.02 | 0.0016 | 0.0031 | 0.032 | 0.000 | — | 1.15 | Comparativesteel |
| d | 0.067 | 0.98 | 2.13 | 0.017 | <u>0.0243</u> | 0.04 | 0.0029 | 0.0027 | 0.000 | 0.012 | — | 1.02 | Comparativesteel |
| e | 0.076 | 0.16 | 1.75 | 0.013 | <u>0.0026</u> | 0.03 | 0.0012 | 0.0049 | 0.143 | 0.021 | — | <u>0.19</u> | Comparativesteel |

According to Table 1, chemical compositions of steels A to RIM were within a chemical composition range specified in the present invention. Meanwhile, steel "a" had too low a C content, steel "b" had too high a C content, steel "c" had too high a P content, steel "d" had too high a S content, and steel "e" had too low a total content of Si and Al. The underlines indicate component amounts falling outside the invention range.

Using the molten steel with the chemical compositions of steels A to H and steels "a" to "e", hot-rolled steel sheets were produced by the above-described steps [a] to [h]. Each step was performed under conditions shown in Tables 2 and 3. In step [d], rolling at 1100° C. or lower was performed in six passes of P1 to P6. Steels A to H and steels "a" to "e" shown in Tables 2 and 3 correspond to the molten steel with the chemical compositions shown in Table 1, and indicate the used molten steel. As $T_1$ (° C.), the average temperature of a soaking area of a heating furnace was measured as the average temperature of the slab in a soaking area. P1 to P6 indicate first to sixth passes in the finish rolling step.

TABLE 2

| | Hot rolling conditions | | | | | | | | | | | |
|---|---|---|---|---|---|---|---|---|---|---|---|---|
| | Average temperature of soaking area of heating furnace, | | Slab heating | Reduction ratio during rough rolling | Ar3 | Number of times of cooling slab surface layer to Ar3 point | Shape ratio X in each rolling at 1100° C. or lower | | | | | |
| Steel | T1 (° C.) | t1(s) | time (s) | (%) | (° C.) | or lower | P1 | P2 | P3 | P4 | P5 | P6 |
| A-1 | 1215 | 3061 | 5837 | 76 | 791 | 4 | 1.8 | 2.1 | 5.7 | 4.9 | 2.6 | 5.2 |
| B-1 | 1242 | 2086 | 7210 | 90 | 783 | 3 | 1.7 | 1.9 | 4.6 | 5.5 | 2.6 | 5.7 |
| C-1 | 1271 | 1403 | 4672 | 75 | 737 | 3 | 1.8 | 2.2 | 5.7 | 5.3 | 4.5 | 2.6 |
| C-2 | 1217 | 2973 | 7456 | 88 | 737 | 3 | 2.0 | 1.6 | 3.8 | 4.5 | 5.1 | 2.9 |
| C-3 | 1205 | 3540 | 7421 | 75 | 737 | 3 | 2.1 | 1.9 | 3.9 | 5.6 | 4.5 | 3.5 |
| C-4 | 1186 | 4693 | 7527 | 91 | 737 | 4 | 1.8 | 2.0 | 4.8 | 3.0 | 2.8 | 3.0 |
| C-5 | 1259 | 1650 | 4046 | 85 | 737 | 3 | 1.6 | 2.1 | 2.7 | 4.6 | 4.7 | 4.2 |
| C-6 | 1240 | 2145 | 7198 | 75 | 737 | 3 | 2.1 | 1.7 | 4.5 | 4.9 | 4.7 | 5.4 |
| C-7 | 1202 | 3699 | 8673 | 85 | 737 | 3 | 2.1 | 3.4 | 4.3 | 3.6 | 3.0 | 5.9 |
| C-8 | 1227 | 2577 | 5815 | 88 | 737 | 4 | 1.9 | 2.2 | 2.0 | 3.3 | 4.7 | 2.7 |
| C-9 | 1185 | 4764 | 8225 | 78 | 737 | 4 | 1.9 | 1.5 | 2.1 | 2.9 | 3.0 | 1.9 |
| C-10 | 1216 | 3017 | 4818 | 78 | 737 | 3 | 1.6 | 1.7 | 4.6 | 3.2 | 5.6 | 2.6 |
| C-11 | 1257 | 1696 | 4264 | 75 | 737 | 3 | 1.5 | 2.2 | 3.9 | 4.3 | 4.4 | 4.0 |
| C-12 | 1193 | 4226 | 7570 | 87 | 737 | 3 | 2.1 | 2.2 | 3.7 | 3.6 | 4.0 | 3.8 |
| C-13 | 1186 | 4693 | 7599 | 86 | 737 | 4 | 1.8 | 1.5 | 4.8 | 3.7 | 3.3 | 4.6 |
| C-14 | 1237 | 2237 | 6601 | 80 | 737 | 3 | 2.2 | 2.0 | 3.5 | 3.8 | 4.9 | 4.6 |
| C-15 | 1233 | 2367 | 4673 | 83 | 737 | 3 | 1.5 | 2.2 | 4.2 | 4.7 | 5.0 | 5.6 |
| C-16 | 1245 | 2001 | 6003 | 78 | 737 | 3 | 1.9 | 2.1 | 3.5 | 5.5 | 3.9 | 2.7 |
| C-17 | 1265 | 1521 | 5608 | 86 | 737 | 4 | 1.7 | 2 | 3.1 | 3.2 | 2.6 | 5.4 |
| D-1 | 1249 | 1893 | 3854 | 80 | 892 | 4 | 1.9 | 1.6 | 3.8 | 4.8 | 2.7 | 4.7 |
| E-1 | 1278 | 1278 | 3309 | 86 | 744 | 3 | 1.6 | 1.9 | 4.5 | 3.8 | 3.8 | 4.5 |
| E-2 | 1258 | 1673 | 2893 | 84 | 744 | 4 | 1.9 | 2.0 | 2.6 | 3.1 | 5.1 | 3.2 |
| E-3 | 1248 | 1919 | 1809 | 76 | 744 | | 1.6 | 2.1 | 4.7 | 4.1 | 2.7 | 5.7 |
| E-4 | 1194 | 4164 | 9545 | 57 | 744 | 3 | 2.0 | 1.6 | 2.9 | 2.8 | 3.4 | 4.5 |
| E-5 | 1180 | 5138 | 9540 | 41 | 744 | 4 | 1.6 | 1.6 | 3.8 | 4.5 | 2.7 | 2.9 |
| E-6 | 1215 | 3061 | 6371 | 81 | 744 | 2 | 1.8 | 1.5 | 2.7 | 3.1 | 5.5 | 5.5 |
| E-7 | 1240 | 2145 | 5609 | 81 | 744 | 1 | 1.9 | 1.9 | 3.8 | 4.4 | 5.0 | 4.3 |
| E-8 | 1193 | 4226 | 8165 | 78 | 744 | 3 | 1.9 | 1.6 | 2.0 | 1.8 | 2.2 | 5.4 |
| E-9 | 1184 | 4836 | 9657 | 86 | 744 | 4 | 2.1 | 1.8 | 2.1 | 1.9 | 5.1 | 3.0 |
| E-10 | 1190 | 4420 | 8323 | 80 | 744 | 4 | 3.1 | 4.2 | 3.2 | 3.6 | 4.5 | 4.5 |
| E-11 | 1228 | 2540 | 6029 | 91 | 744 | 3 | 2.0 | 2.0 | 3.4 | 1.8 | 1.9 | 3.1 |
| F-1 | 1268 | 1461 | 3444 | 81 | 741 | 4 | 2.0 | 1.7 | 4.9 | 3.3 | 4.4 | 3.1 |
| G-1 | 1192 | 4290 | 6670 | 83 | 727 | 3 | 2.2 | 1.9 | 2.7 | 2.8 | 5.6 | 3.9 |
| H-1 | 1264 | 1542 | 4717 | 86 | 806 | 4 | 1.5 | 2.0 | 4.6 | 4.4 | 4.6 | 4.8 |
| a-1 | 1267 | 1481 | 4298 | 77 | 756 | 4 | 1.8 | 1.8 | 4.8 | 4.8 | 3.6 | 5.7 |
| b-1 | 1277 | 1295 | 5805 | 84 | 693 | 3 | 1.5 | 1.8 | 4.9 | 4.2 | 5.5 | 3.3 |
| c-1 | 1188 | 4554 | 7487 | 83 | 771 | 3 | 1.8 | 1.7 | 4.9 | 3.3 | 5.2 | 3.2 |
| d-1 | 1238 | 2206 | 6600 | 85 | 722 | 4 | 1.5 | 2.2 | 3.3 | 3.6 | 3.2 | 3.4 |
| e-1 | 1255 | 1743 | 6844 | 79 | 726 | 4 | 2.1 | 1.5 | 2.7 | 4.2 | 4.6 | 5.4 |

| Steel | Number of times of rolling in which X ≥ 2.3 | Reduction ratio of rolling at 1100° C. or lower (%) | T2 (° C.) | Final reduction temperature of finish rolling (° C.) | Final reduction ratio of finish rolling (%) | Remarks |
|---|---|---|---|---|---|---|
| A-1 | 4 | 69 | 888 | 823 | 26 | Invention steel |
| B-1 | 4 | 74 | 876 | 866 | 25 | Invention steel |
| C-1 | 4 | 85 | 903 | 862 | 28 | Invention steel |
| C-2 | 4 | 86 | 903 | 946 | 22 | Comparativesteel |
| C-3 | 4 | 79 | 903 | 916 | 26 | Invention steel |
| C-4 | 4 | 86 | 903 | 902 | 15 | Invention steel |
| C-5 | 4 | 89 | 903 | 818 | 20 | Invention steel |
| C-6 | 4 | 80 | 903 | 782 | 24 | Comparativesteel |
| C-7 | 5 | 92 | 903 | 893 | 39 | Invention steel |
| C-8 | 3 | 63 | 903 | 856 | 6 | Invention steel |
| C-9 | 2 | 73 | 903 | 865 | 2 | Comparativesteel |
| C-10 | 4 | 74 | 903 | 824 | 28 | Invention steel |
| C-11 | 4 | 74 | 903 | 832 | 15 | Comparativesteel |
| C-12 | 4 | 88 | 903 | 847 | 16 | Invention steel |
| C-13 | 4 | 84 | 903 | 862 | 23 | Comparativesteel |
| C-14 | 4 | 88 | 903 | 883 | 25 | Invention steel |
| C-15 | 4 | 70 | 903 | 840 | 15 | Comparativesteel |
| C-16 | 4 | 81 | 903 | 851 | 20 | Invention steel |
| C-17 | 4 | 85 | 903 | 879 | 26 | Comparativesteel |
| D-1 | 4 | 80 | 895 | 853 | 24 | Invention steel |
| E-1 | 4 | 74 | 875 | 815 | 27 | Invention steel |

TABLE 2-continued

| | | | Hot rolling conditions | | | |
|---|---|---|---|---|---|---|
| E-2 | 4 | 75 | 875 | 856 | 17 | Invention steel |
| E-3 | 4 | 74 | 875 | 804 | 30 | Comparativesteel |
| E-4 | 4 | 69 | 875 | 813 | 26 | Invention steel |
| E-5 | 4 | 90 | 875 | 814 | 28 | Comparativesteel |
| E-6 | 4 | 78 | 875 | 812 | 17 | Invention steel |
| E-7 | 4 | 65 | 875 | 824 | 30 | Comparativesteel |
| E-8 | 1 | 43 | 875 | 808 | 20 | Comparativesteel |
| E-9 | 2 | 67 | 875 | 796 | 21 | Invention steel |
| E-10 | 6 | 95 | 875 | 824 | 27 | Invention steel |
| E-11 | 2 | 34 | 875 | 847 | 25 | Comparativesteel |
| F-1 | 4 | 90 | 874 | 832 | 26 | Invention steel |
| G-1 | 4 | 66 | 942 | 917 | 17 | Invention steel |
| H-1 | 4 | 73 | 899 | 887 | 30 | Invention steel |
| a-1 | 4 | 76 | 873 | 860 | 17 | Comparativesteel |
| b-1 | 4 | 87 | 920 | 882 | 27 | Comparativesteel |
| c-1 | 4 | 84 | 879 | 831 | 22 | Comparativesteel |
| d-1 | 4 | 82 | 876 | 812 | 25 | Comparativesteel |
| e-1 | 4 | 83 | 914 | 904 | 26 | Comparativesteel |

TABLE 3

| | Hot rolling conditions | | | | | | |
|---|---|---|---|---|---|---|---|
| Steel | Cooling rate from final reduction to 750° C. (° C./s) | T3 (° C.) | Cooling rate from 750° C. to T3° C. (° C./s) | T4 (° C.) | Holding time at T3° C. to T4° C. (s) | Winding temperature | Remarks |
| A-1 | 85 | 683 | 95 | 490 | 8.8 | 252 | Invention steel |
| B-1 | 68 | 672 | 91 | 457 | 11.9 | 69 | Invention steel |
| C-1 | 85 | 661 | 73 | 475 | 6.8 | 83 | Invention steel |
| C-2 | 100 | 661 | 98 | 475 | 7.2 | 121 | Comparativesteel |
| C-3 | 98 | 661 | 81 | 475 | 8.9 | 179 | Invention steel |
| C-4 | 76 | 661 | 74 | 475 | 6.5 | 224 | Invention steel |
| C-5 | 79 | 661 | 60 | 475 | 8.9 | 50 | Invention steel |
| C-6 | 79 | 661 | 70 | 475 | 7.4 | 308 | Comparativesteel |
| C-7 | 71 | 661 | 101 | 475 | 11.5 | 198 | Invention steel |
| C-8 | 73 | 661 | 88 | 475 | 8 | 254 | Invention steel |
| C-9 | 74 | 661 | 91 | 475 | 6.5 | 211 | Comparativesteel |
| C-10 | 62 | 661 | 64 | 475 | 7.7 | 199 | Invention steel |
| C-11 | 49 | 661 | 78 | 475 | 9.6 | 193 | Comparativesteel |
| C-12 | 72 | 661 | 52 | 475 | 9.6 | 110 | Invention steel |
| C-13 | 81 | 661 | 25 | 475 | 6.9 | 193 | Comparativesteel |
| C-14 | 107 | 661 | 105 | 475 | 14.5 | 246 | Invention steel |
| C-15 | 103 | 661 | 104 | 475 | 3.1 | 213 | Comparativesteel |
| C-16 | 106 | 661 | 81 | 475 | 10.5 | 457 | Invention steel |
| C-17 | 86 | 661 | 79 | 475 | 10.9 | 533 | Comparativesteel |
| D-1 | 89 | 764 | 101 | 510 | 9.5 | 71 | Invention steel |
| E-1 | 108 | 624 | 90 | 460 | 8.6 | 250 | Invention steel |
| E-2 | 69 | 624 | 75 | 460 | 10.6 | 140 | Invention steel |
| E-3 | 76 | 624 | 69 | 460 | 10.1 | 281 | Comparativesteel |
| E-4 | 94 | 624 | 105 | 460 | 12.1 | 157 | Invention steel |
| E-5 | 91 | 624 | 76 | 460 | 12 | 140 | Comparativesteel |
| E-6 | 76 | 624 | 80 | 460 | 6.8 | 257 | Invention steel |
| E-7 | 115 | 624 | 98 | 460 | 10 | 113 | Comparativesteel |
| E-8 | 113 | 624 | 61 | 460 | 10.7 | 300 | Comparativesteel |
| E-9 | 77 | 624 | 77 | 460 | 10.5 | 68 | Invention steel |
| E-10 | 80 | 624 | 76 | 460 | 11.5 | 235 | Invention steel |
| E-11 | 93 | 624 | 78 | 460 | 10.6 | 222 | Comparativesteel |
| F-1 | 113 | 620 | 74 | 459 | 11.6 | 271 | Invention steel |
| G-1 | 93 | 627 | 65 | 456 | 9.9 | 178 | Invention steel |
| H-1 | 88 | 638 | 71 | 468 | 9.8 | 90 | Invention steel |
| a-1 | 106 | 645 | 64 | 487 | 11.3 | 191 | Comparativesteel |
| b-1 | 94 | 592 | 66 | 380 | 9.9 | 235 | Comparativesteel |
| c-1 | 93 | 631 | 90 | 461 | 8.1 | 51 | Comparativesteel |
| d-1 | 108 | 620 | 100 | 459 | 6.6 | 255 | Comparativesteel |
| e-1 | 82 | 651 | 86 | 467 | 11.4 | 81 | Comparativesteel |

Regarding the produced hot-rolled steel sheets, an area fraction of each structure of ferrite, bainite, and hard phases (martensite and austenite) was determined, and the shape of the hard phases and an X-ray random intensity ratio were measured. In addition, tensile strength characteristics, a hole expansion ratio, and fatigue characteristics were measured. As conditions for measuring these characteristics, the above-described measurement conditions were used. Fatigue test pieces with the shape and dimensions illustrated in FIG. 1 were used, and the thickness of each test piece was set to 3 mm. Tables 4 and 5 show the measurement results of the characteristics. Steel grades of the hot-rolled steel sheets were a hot-rolled steel sheet without plating (HR), a hot-dip galvanized steel sheet without alloying after plating (GI), and an alloyed hot-dip galvanized steel sheet (GA).

TABLE 4

Microstructure and mechanical properties

| Steel | Steel grade* | Ferrite area fraction (%) | Bainite area fraction (%) | Sum of area fractions of martensite and austenite (%) | Proportion of martensite grains with aspect ratio of 3 or more in martensite grains in sheet-thickness central portion (%) | Length in rolling direction of martensite grains in sheet-thickness central portion (μm) | Sum of X-ray random intensity ratios of <011> orientation and <111> orientation as viewed from rolling direction | Sum of X-ray random intensity ratios of <001> orientation as viewed from rolling direction | Remarks |
|---|---|---|---|---|---|---|---|---|---|
| A-1 | HR | 14.6 | 79.8 | 5.6 | 94 | 9.4 | 5.6 | 0.7 | Invention steel |
| B-1 | HR | 3.9 | 79.6 | 16.5 | 89 | 12.8 | 5.7 | 0.6 | Invention steel |
| C-1 | GI | 10.4 | 81.7 | 7.9 | 89 | 9.6 | 5.3 | 0.7 | Invention steel |
| C-2 | HR | 8.6 | 82.8 | 8.6 | 48 | 7.1 | 4.9 | 0.7 | Comparative steel |
| C-3 | HR | 7.2 | 85.4 | 7.4 | 67 | 8.2 | 4.9 | 0.7 | Invention steel |
| C-4 | HR | 8 | 84.8 | 7.2 | 82 | 10.3 | 5.0 | 0.7 | Invention steel |
| C-5 | HR | 20.9 | 70.1 | 9.0 | 96 | 9.4 | 5.2 | 0.6 | Invention steel |
| C-6 | HR | 70.4 | 21.1 | 8.5 | 100 | 10.2 | 5.3 | 0.6 | Comparative steel |
| C-7 | HR | 4.8 | 87.8 | 7.4 | 96 | 12.4 | 5.3 | 0.7 | Invention steel |
| C-8 | HR | 13.1 | 79.8 | 7.1 | 71 | 12.3 | 4.6 | 0.7 | Invention steel |
| C-9 | HR | 9 | 83.0 | 8.0 | 51 | 11.1 | 4.2 | 0.7 | Comparative steel |
| C-10 | GA | 19.1 | 72.3 | 8.6 | 88 | 18.6 | 4.8 | 0.7 | Invention steel |
| C-11 | HR | 12.9 | 78.8 | 8.3 | 93 | 22.4 | 5.4 | 0.6 | Comparative steel |
| C-12 | HR | 35.7 | 55.8 | 8.5 | 92 | 11.0 | 5.1 | 0.6 | Invention steel |
| C-13 | HR | 68.4 | 22.4 | 9.2 | 86 | 10.6 | 5.0 | 0.7 | Comparative steel |
| C-14 | HR | 3.7 | 89.2 | 7.1 | 82 | 6.7 | 5.0 | 0.7 | Invention steel |
| C-15 | HR | 11.9 | 1.7 | 86.4 | 92 | 6.8 | 5.7 | 0.7 | Comparative steel |
| C-16 | GI | 12.2 | 80.5 | 7.3 | 86 | 4.8 | 4.7 | 0.7 | Invention steel |
| C-17 | HR | 5.9 | 91.5 | 2.6 | 82 | 8.3 | 4.9 | 0.7 | Comparative steel |
| D-1 | HR | 12 | 77.7 | 10.3 | 93 | 7.8 | 4.9 | 0.7 | Invention steel |
| E-1 | HR | 10.5 | 80.2 | 9.3 | 89 | 3.8 | 5.1 | 0.7 | Invention steel |
| E-2 | HR | 8.4 | 82.0 | 9.6 | 88 | 19.0 | 4.8 | 0.7 | Invention steel |
| E-3 | HR | 17 | 74.3 | 8.7 | 93 | 23.9 | 5.4 | 0.7 | Comparative steel |
| E-4 | HR | 11.7 | 77.1 | 11.2 | 88 | 8.3 | 4.3 | 0.7 | Invention steel |
| E-5 | HR | 10.8 | 78.8 | 10.4 | 90 | 7.6 | 1.0 | 1.0 | Comparative steel |
| E-6 | HR | 15.7 | 75.4 | 8.9 | 88 | 9.8 | 8.8 | 0.9 | Invention steel |
| E-7 | HR | 13 | 77.8 | 9.2 | 85 | 3.8 | 2.8 | 1.1 | Comparative steel |
| E-8 | HR | 16.7 | 73.6 | 9.7 | 87 | 5.5 | 2.4 | 1.0 | Comparative steel |
| E-9 | HR | 16 | 73.9 | 10.1 | 91 | 10.2 | 3.7 | 0.9 | Invention steel |
| E-10 | HR | 8.5 | 81.1 | 10.4 | 89 | 11.1 | 6.2 | 0.5 | Invention steel |
| E-11 | HR | 5.4 | 85.9 | 8.7 | 86 | 7.9 | 3.4 | 1.2 | Comparative steel |
| F-1 | HR | 8.5 | 82.8 | 8.7 | 85 | 5.1 | 5.2 | 0.7 | Invention steel |
| G-1 | GA | 10.7 | 77.4 | 11.9 | 89 | 9.1 | 4.8 | 0.7 | Invention steel |
| H-1 | HR | 6.5 | 84.9 | 8.6 | 83 | 9.5 | 5.7 | 0.6 | Invention steel |
| a-1 | HR | 43.9 | 53.8 | 2.3 | 88 | 5.7 | 5.2 | 0.7 | Comparative steel |
| b-1 | HR | 13.6 | 53.7 | 32.7 | 93 | 8.7 | 5.1 | 0.7 | Comparative steel |
| c-1 | HR | 8.1 | 82.1 | 9.8 | 89 | 8.8 | 4.9 | 0.6 | Comparative steel |
| d-1 | HR | 12.2 | 78.9 | 8.9 | 93 | 4.5 | 4.9 | 0.7 | Comparative steel |
| e-1 | HR | 3 | 87.0 | 10.0 | 87 | 8.6 | 5.0 | 0.7 | Comparative steel |

TABLE 5

Microstructure and mechanical properties

| Steel | Tensile strength, TS (MPa) | Total elongation, El (%) | Hole expansion ratio, λ (%) | TS × El | TS × λ | Fatigue limit ratio in rolling direction | Punching fatigue limit ratio in rolling direction | Remarks |
|---|---|---|---|---|---|---|---|---|
| A-1 | 820 | 24.0 | 73 | 19680 | 59860 | 0.68 | 0.32 | Invention steel |
| B-1 | 875 | 21.2 | 47 | 18550 | 41125 | 0.71 | 0.41 | Invention steel |
| C-1 | 820 | 23.4 | 69 | 19188 | 56580 | 0.56 | 0.39 | Invention steel |
| C-2 | 834 | 22.9 | 67 | 19099 | 55878 | 0.58 | 0.24 | Comparative steel |
| C-3 | 840 | 22.7 | 68 | 19068 | 57120 | 0.55 | 0.33 | Invention steel |

TABLE 5-continued

Microstructure and mechanical properties

| Steel | Tensile strength, TS (MPa) | Total elongation, El (%) | Hole expansion ratio, λ (%) | TS × El | TS × λ | Fatigue limit ratio in rolling direction | Punching fatigue limit ratio in rolling direction | Remarks |
|---|---|---|---|---|---|---|---|---|
| C-4  | 817  | 24.2 | 71  | 19771 | 58007 | 0.55 | 0.36 | Invention steel |
| C-5  | 798  | 24.9 | 69  | 19870 | 55062 | 0.56 | 0.40 | Invention steel |
| C-6  | 773  | 22.0 | 72  | 17006 | 55656 | 0.56 | 0.36 | Comparative steel |
| C-7  | 838  | 22.3 | 68  | 18687 | 56984 | 0.55 | 0.39 | Invention steel |
| C-8  | 803  | 24.2 | 72  | 19433 | 57816 | 0.55 | 0.34 | Invention steel |
| C-9  | 829  | 23.3 | 68  | 19316 | 56372 | 0.55 | 0.21 | Comparative steel |
| C-10 | 810  | 23.7 | 50  | 19197 | 40500 | 0.55 | 0.38 | Invention steel |
| C-11 | 823  | 23.4 | 40  | 19258 | 32920 | 0.59 | 0.42 | Comparative steel |
| C-12 | 784  | 25.8 | 71  | 20227 | 55664 | 0.59 | 0.37 | Invention steel |
| C-13 | 661  | 30.7 | 83  | 20293 | 54863 | 0.58 | 0.42 | Comparative steel |
| C-14 | 838  | 23.2 | 69  | 19442 | 57822 | 0.56 | 0.41 | Invention steel |
| C-15 | 976  | 18.0 | 37  | 17568 | 36112 | 0.57 | 0.38 | Comparative steel |
| C-16 | 781  | 24.5 | 74  | 19135 | 57794 | 0.55 | 0.38 | Invention steel |
| C-17 | 712  | 26.8 | 91  | 19082 | 64792 | 0.56 | 0.18 | Comparative steel |
| D-1  | 842  | 22.5 | 63  | 18945 | 53046 | 0.66 | 0.42 | Invention steel |
| E-1  | 809  | 23.5 | 67  | 19012 | 54203 | 0.69 | 0.39 | Invention steel |
| E-2  | 803  | 23.9 | 53  | 19192 | 42559 | 0.67 | 0.41 | Invention steel |
| E-3  | 782  | 25.0 | 43  | 19550 | 33626 | 0.73 | 0.40 | Comparative steel |
| E-4  | 822  | 23.1 | 63  | 18988 | 51786 | 0.62 | 0.39 | Invention steel |
| E-5  | 811  | 23.5 | 65  | 19059 | 52715 | 0.53 | 0.38 | Comparative steel |
| E-6  | 787  | 24.5 | 70  | 19282 | 55090 | 0.57 | 0.41 | Invention steel |
| E-7  | 801  | 24.3 | 68  | 19464 | 54468 | 0.53 | 0.37 | Comparative steel |
| E-8  | 780  | 25.3 | 69  | 19734 | 53820 | 0.49 | 0.36 | Comparative steel |
| E-9  | 788  | 25.0 | 68  | 19700 | 53584 | 0.56 | 0.39 | Invention steel |
| E-10 | 813  | 23.3 | 65  | 18943 | 52845 | 0.74 | 0.42 | Invention steel |
| E-11 | 810  | 23.9 | 68  | 19359 | 55080 | 0.50 | 0.38 | Comparative steel |
| F-1  | 802  | 22.9 | 46  | 18366 | 36892 | 0.67 | 0.39 | Invention steel |
| G-1  | 793  | 23.2 | 48  | 18398 | 38064 | 0.66 | 0.41 | Invention steel |
| H-1  | 801  | 24.1 | 69  | 19304 | 55269 | 0.69 | 0.40 | Invention steel |
| a-1  | 603  | 34.1 | 108 | 20562 | 65124 | 0.70 | 0.20 | Comparative steel |
| b-1  | 1016 | 16.8 | 29  | 17069 | 29464 | 0.68 | 0.38 | Comparative steel |
| c-1  | 782  | 22.3 | 42  | 17439 | 32844 | 0.65 | 0.34 | Comparative steel |
| d-1  | 792  | 25.0 | 42  | 19800 | 33264 | 0.68 | 0.37 | Comparative steel |
| e-1  | 809  | 23.0 | 66  | 18607 | 53394 | 0.51 | 0.38 | Comparative steel |

As shown in Tables 2 to 5, steels A-1, B-1, C-1, C-3 to C-5, C-7, C-8, C-10, C-12, C-14, C-16, D-1, E-1, E-2, E-4, E-6, E-9, E-10, F-1, G-1, H-1, and I-1 are examples each having a chemical composition and microstructure of steel satisfying those specified in the present invention. Meanwhile, steels C-2, C-6, C-9, C-11, C-13, C-15, C-17, E-3, E-5, E-7, E-8, E-11, a-1, b-1, c-1, d-1, and e-1 are examples each having a chemical composition and microstructure of steel not satisfying those specified in the present invention.

For all of the hot-rolled steel sheets of the present invention examples, such as steel A-1, the area fraction of the hard phases, the proportion of the hard phases with an aspect ratio of 3 or more in the hard phases present in the sheet-thickness central portion, the length in the rolling direction of the hard phases present in the sheet-thickness central portion, and the X-ray random intensity ratio all satisfied those specified in the present invention. Moreover, all of the hot-rolled steel sheets of the present invention examples exhibited a tensile strength of 780 MPa or more. Furthermore, the hot-rolled steel sheets of the present invention examples satisfied (tensile strength (MPa))×(total elongation (%))≥18000 and (tensile strength (MPa))×(hole expansion ratio (%))≥35000, and exhibited a fatigue limit of 0.55 or more and a punching fatigue limit of 0.30 or more.

For steel C-2 as a comparative example, the reduction temperature in the final pass of finish rolling in step [d] was 946° C., which is higher than $T_2$ (903° C.), specified in formula (D), by more than 20° C. For steel C-9, the reduction ratio in the final pass of finish rolling in step [d] was as low as 2%. Therefore, for both examples, the proportion of the hard phases with an aspect ratio of 3 or more in the hard phases present in the sheet-thickness central portion was as low as less than 60%, and the punching fatigue limit ratio in the rolling direction was a low value of less than 0.3.

For steel C-6, the reduction temperature in the final pass of finish rolling in step [d] was 782° C., which is lower than $T_2$ (903° C.), specified in formula (D), by more than 100° C. For steel C-13, the average cooling rate in a temperature range of equal to or higher than $T_3$(° C.) and lower than 750° C. in step [f] was 25° C./s, which is too low. Therefore, for both examples, ferrite had its generation promoted to have a high area fraction of 68% or more, and bainite had an area fraction as low as 23% or less, not serving as the main constituent of the microstructure. Consequently, both examples exhibited a tensile strength of less than 780 MPa. In particular, for steel C-6, the generated ferrite was unrecrystallized ferrite and low ductility was exhibited, and (tensile strength (MPa))×(total elongation (%))≥18000 was not satisfied.

For steel C-11, the average cooling rate from the final reduction temperature to 750° C. in step [e] was 49° C., which is too low. Therefore, the length in the rolling direction of the hard phases in the sheet-thickness central portion was as long as 22.4 μm, and (tensile strength (MPa))×(hole expansion ratio (%))≥35000 was not satisfied.

For steel C-15, the holding time in a temperature range of equal to or higher than $T_3$(° C.) and lower than $T_4$(° C.) in step [g] was 3.1 s, which is too short; thus, the area fraction of the hard phases was as high as 86.4%, bainite not serving as the main constituent of the microstructure. Therefore, low ductility was exhibited, and (tensile strength (MPa))×(total elongation (%))≥18000 was not satisfied.

For steel C-17, the winding temperature in step [h] was 533° C., which is higher than $T_4$ (475° C.) specified in formula (F). Therefore, the area fraction of bainite in the structure of the hot-rolled steel sheet was 91.5%, which is excessive, and the area fraction of the hard phases was as low as less than 3%. Consequently, the tensile strength was as low as less than 780 MPa, and the punching fatigue limit ratio in the rolling direction was as low as less than 0.3.

For steel E-3, the slab heating time in step [b] was 1809 s, which is shorter than time $t_1$ (1919 s) specified in formula (A). Therefore, the length in the rolling direction of the hard phases in the sheet-thickness central portion was as long as 23.9 μm, and (tensile strength (MPa))×(hole expansion ratio (%))≥35000 was not satisfied.

For steel E-5, the total reduction ratio during rough rolling in step [c] was as low as 41%. For steel E-7, the number of times of cooling the slab surface layer to $Ar_3$ transformation point or lower during rough rolling in step [c] was only once. For steel E-8, of the six rolling passes in step [d], only one pass satisfied a shape ratio X of 2.3 or more. For steel E-11, the reduction ratio of rolling at 1100° C. or lower in step [d] was as low as 34%. Therefore, in these steels, the sum of X-ray random intensity ratios of <011> orientation and <111> orientation as viewed from the rolling direction was as low as less than 3.5, and an X-ray random intensity ratio of <001> orientation as viewed from the rolling direction was more than 1.0. Consequently, these steels all exhibited a fatigue limit ratio in the rolling direction as low as less than 0.55.

For steel a-1, the C content was 0.016%, which is too low. Therefore, the tensile strength was as low as less than 780 MPa, and the punching fatigue limit ratio in the rolling direction was as low as less than 0.3.

For steel b-1, the C content was 0.254%, which is too high. For steel d-1, the S content was 0.0243%, which is too high. Therefore, both examples exhibited low hole expandability and did not satisfy (tensile strength (MPa))×(hole expansion ratio (%))≥35000.

For steel c-1, the P content was 0.133%, which is too high. Therefore, low workability was exhibited, and neither (tensile strength (MPa))×(total elongation (%))≥18000 nor (tensile strength (MPa))×(hole expansion ratio (%))≥35000 was satisfied.

For steel e-1, the total content of Si and Al was 0.19%, which is too low. Therefore, fatigue crack initiation life was short, and the fatigue limit ratio in the rolling direction was as low as 0.51.

INDUSTRIAL APPLICABILITY

According to the present invention, a hot-rolled steel sheet having excellent fatigue characteristics in the rolling direction and workability and having a tensile strength of 780 MPa or more can be provided. The present invention can be suitably applied to steel sheets with a sheet thickness of 8 mm or less. A hot-rolled steel sheet according to the present invention can prolong fatigue life of suspension parts and the like of automobile materials, thus significantly contributing to the industry.

REFERENCE SIGNS LIST 1 punching hole of fatigue test piece

The invention claimed is:
1. A hot-rolled steel sheet having a chemical composition consisting of, in mass %,
C: 0.03 to 0.2%,
Mn: 0.1 to 3.0%,
P: 0.10% or less,
S: 0.03% or less,
Al+Si: 0.2 to 3.0%,
N: more than 0% and equal to or less than 0.01%,
O: more than 0% and equal to or less than 0.01%,
Ti: 0 to 0.3%,
Nb: 0 to 0.3%,
Mg: 0 to 0.01%,
Ca: 0 to 0.01%,
REM: 0 to 0.1%,
B: 0 to 0.01%,
Cu: 0 to 2.0%,
Ni: 0 to 2.0%,
Mo: 0 to 1.0%,
V: 0 to 0.3%,
Cr: 0 to 2.0%, and
the balance: iron and impurities, and
a microstructure of the hot-rolled steel sheet which contains bainite as the main constituent, and contains hard phases constituted by martensite and/or austenite in an amount of, in area fraction, equal to or more than 3% and less than 20%,
wherein 60% or more of a number of the hard phases present in a sheet-thickness central portion have an aspect ratio of 3 or more,
the hard phases present in the sheet-thickness central portion have a length in a rolling direction of less than 20 μm, and
the sum of X-ray random intensity ratios of <011> orientation and <111> orientation as viewed from the rolling direction is 3.5 or more, and an X-ray random intensity ratio of <001> orientation as viewed from the rolling direction is 1.0 or less.

2. The hot-rolled steel sheet according to claim 1, wherein Ti, Nb or a combination thereof are present and are in mass %,
Ti: (0.005+48/14[N]+48/32[S])% or more to 0.3% or less, and
Nb: 0.01 to 0.3%,
where [N] indicates an N content (mass %) and [S] indicates an S content (mass %).

3. The hot-rolled steel sheet according to claim 1,
wherein Mg, Ca, REM or a combination thereof are present and are in mass %,
Mg: 0.0005 to 0.01%,
Ca: 0.0005 to 0.01%, and
REM: 0.0005 to 0.1%.

4. The hot-rolled steel sheet according to claim 1, wherein B is, in mass %,
B: 0.0002 to 0.01%.

5. The hot-rolled steel sheet according to claim 1, wherein Cu, Ni, Mo, V, Cr or a combination thereof are present and are in mass %, Cu: 0.01 to 2.0%,
Ni: 0.01 to 2.0%,
Mo: 0.01 to 1.0%,
V: 0.01 to 0.3%, and
Cr: 0.01 to 2.0%.

6. A hot-rolled steel sheet having a chemical composition consisting of, in mass %,
C: 0.03 to 0.2%,
Mn: 0.1 to 3.0%,
P: 0.10% or less,
S: 0.03% or less,
Al+Si: 0.2 to 3.0%,
N: more than 0% and equal to or less than 0.01%,
O: more than 0% and equal to or less than 0.01%,
Ti: 0 to 0.3%,
Nb: 0 to 0.3%,
Mg: 0 to 0.01%,
Ca: 0 to 0.01%,
REM: 0 to 0.1%,
B: 0 to 0.01%,
Cu: 0 to 2.0%,
Ni: 0 to 2.0%,
Mo: 0 to 1.0%,
V: 0 to 0.3%,
Cr: 0 to 2.0%, and
the balance: iron and impurities, and
a microstructure of the hot-rolled steel sheet which contains bainite as the main constituent, and contains hard phases constituted by martensite and/or austenite in an amount of, in area fraction, equal to or more than 3% and less than 20%,
wherein 60% or more of a number of the hard phases present in a sheet-thickness central portion have an aspect ratio of 3 or more,
the hard phases present in the sheet-thickness central portion have a length in a rolling direction of less than 20 μm, and
the sum of X-ray random intensity ratios of <011> orientation and <111> orientation as viewed from the rolling direction is 3.5 or more, and an X-ray random intensity ratio of <001> orientation as viewed from the rolling direction is 1.0 or less, and
the hot-rolled steel sheet has a hot-dip galvanized layer or a galvannealed layer on its surface.

* * * * *